United States Patent
Lake

[19]

[11] Patent Number: 5,900,333
[45] Date of Patent: * May 4, 1999

[54] METHOD OF FORMING A BATTERY AND SUCH BATTERY FORMED

[75] Inventor: Rickie C. Lake, Eagle, Id.

[73] Assignee: Micron Communications, Inc., Boise, Id.

[*] Notice: This patent is subject to a terminal disclaimer.

[21] Appl. No.: 08/975,788

[22] Filed: Nov. 21, 1997

Related U.S. Application Data

[63] Continuation of application No. 08/759,190, Dec. 4, 1996, Pat. No. 5,705,294, which is a continuation of application No. 08/535,653, Sep. 28, 1995, Pat. No. 5,629,108.

[51] Int. Cl.$^6$ ...................................................... H01M 2/08
[52] U.S. Cl. .......................... 429/174; 29/623.2; 29/623.1; 429/185
[58] Field of Search ...................................... 429/162, 163, 429/174, 185; 29/623.1, 623.2, 623.4; 523/134

[56] References Cited

U.S. PATENT DOCUMENTS

| | | | |
|---|---|---|---|
| 3,597,663 | 8/1971 | Markarian | 317/230 |
| 3,892,593 | 7/1975 | Ieki et al. | 136/133 |
| 4,092,290 | 5/1978 | Bowser | 260/42.36 |
| 4,121,020 | 10/1978 | Epstein et al. | 429/162 |
| 4,224,736 | 9/1980 | Feldhake | 29/623.2 |
| 4,343,869 | 8/1982 | Oltman et al. | 429/27 |
| 5,629,108 | 5/1997 | Lake | 429/174 |
| 5,705,294 | 1/1998 | Lake | 429/163 |

FOREIGN PATENT DOCUMENTS

| | | |
|---|---|---|
| 53-059829 | 5/1978 | Japan . |
| 55-016343 | 2/1980 | Japan . |

OTHER PUBLICATIONS

Japan—Abstract 60193258, Kunio et al., Oct. 1, 1985.
Japan—Abstract 60230355, Yukio et al., Nov. 15, 1985.
Japan—Abstract 53059829, Katsuhiro et al., May 30, 1978.

*Primary Examiner*—John S. Maples
*Attorney, Agent, or Firm*—Wells, St. John, Roberts, Gregory & Matkins P.S.

[57] ABSTRACT

A button-type battery includes, a) an anode; b) a cathode positioned adjacent to the anode; c) an electrolyte between the anode and the cathode; d) a conductive first terminal housing member in electrical contact with one of the anode or the cathode; the first terminal housing member having a periphery; e) a conductive second terminal housing member in electrical contact with the other of the anode or the cathode; the second terminal housing member having a periphery; f) the first and second terminal housing members forming an enclosed housing which holds and protects the anode, the cathode and the electrolyte; and g) the first and second terminal housing member peripheries being configured together to form an electrically insulative seal which seals the anode, the electrolyte and the cathode within the housing formed by the first and second terminal housing members, the electrically insulative seal comprising cross-linked butyl rubber. The seal can include a gasket which constitutes the cross-linked butyl rubber or other material. The seal can comprise an uncured precursor to butyl rubber. Methods of forming such button-type batteries include in situ curing or forming butyl rubber in place on one of the battery terminals. Alternately, a butyl rubber precursor can be applied to one or both of the battery terminals.

17 Claims, 3 Drawing Sheets

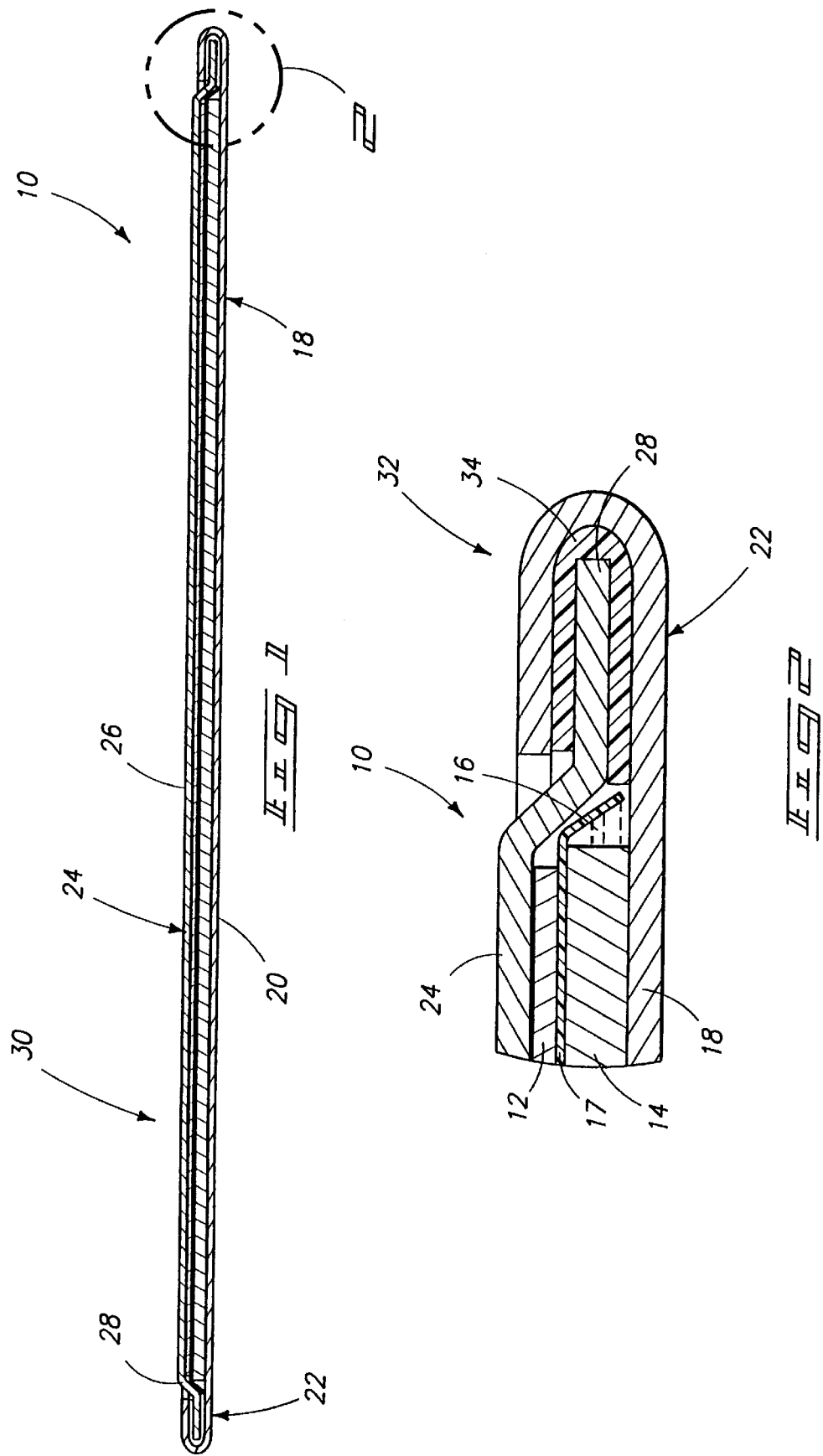

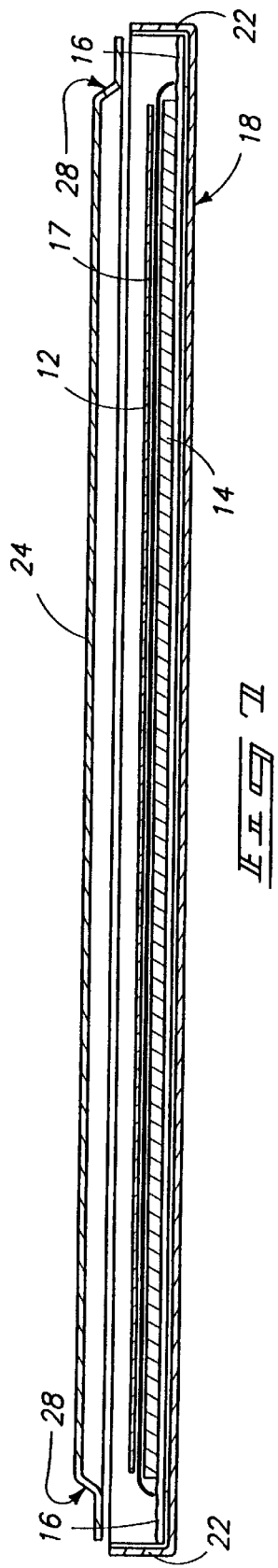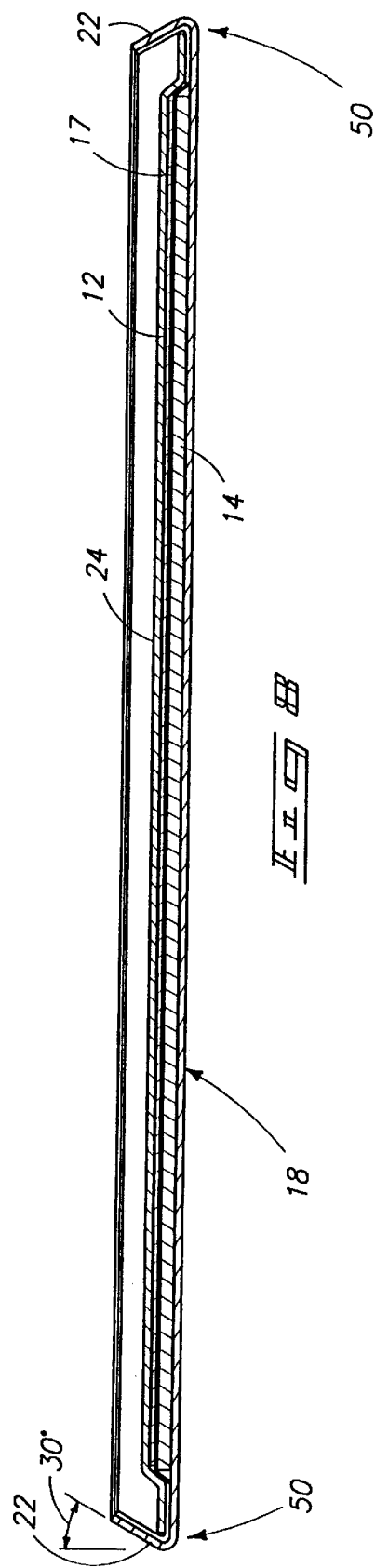

METHOD OF FORMING A BATTERY AND SUCH BATTERY FORMED

RELATED PATENT DATA

This patent resulted from a continuation application of U.S. patent application Ser. No. 08/759,190, filed on Dec. 4, 1996 now U.S. Pat. No. 5,705,294, which is a continuation application of U.S. patent application Ser. No. 08/535,653, filed on Sep. 28, 1995, now U.S. Pat. No. 5,629,108.

TECHNICAL FIELD

This invention relates to methods of forming button-type batteries and to button-type battery constructions.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are typically separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

There is a need in button-type battery usage to make such energy cells thinner. Today, the thinnest commercially available button-type battery has a thickness of 1.2 mm (47.2 mils). It would be desirable to make a thinner battery, particularly one having a thickness of less than 1 mm (39.4 mils). A countering concern, however, is that the integrity of the fluid-tight seal cannot be compromised simply to achieve the goal of thinner batteries.

One challenge in the fabrication of thin button cells concerns the battery seal. Industry standard coin cell battery gaskets typically employ an injection molded polymer gasket (i.e., polypropylene or polyethylene). Minor imperfections and voids in the crimped gasket seal area are normally filled by the application of a supplemental sealant material, such as asphalt. However, conventional injection molding technology is not easily adapted to ultra-thin button cell batteries due to the minimum thickness of the gasket that can be cost effectively obtained. Further, water permeability of the seal becomes problematic with thinner and thinner button cell gaskets and seals.

Accordingly, needs remain in the development of improved materials and methods associated with button-type battery seals.

BRIEF DESCRIPTION OF THE DRAWINGS

Preferred embodiments of the invention are described below with reference to the following accompanying drawings.

FIG. 1 is a cross-sectional view of an assembled button-type battery construction.

FIG. 2 is an enlarged cross-sectional view of a peripheral sealing portion of the FIG. 1 assembly.

FIG. 7 is an enlarged, more-to-scale, cross-sectional, exploded view of a 20 mm diameter battery preassembly utilizing the FIGS. 5 and 6 housing member, and other components.

FIG. 8 is a cross-sectional view of the FIG. 7 assembly at a processing step subsequent to that shown by FIG. 7.

DETAILED DESCRIPTION OF THE PREFERRED EMBODIMENTS

Figure 3:
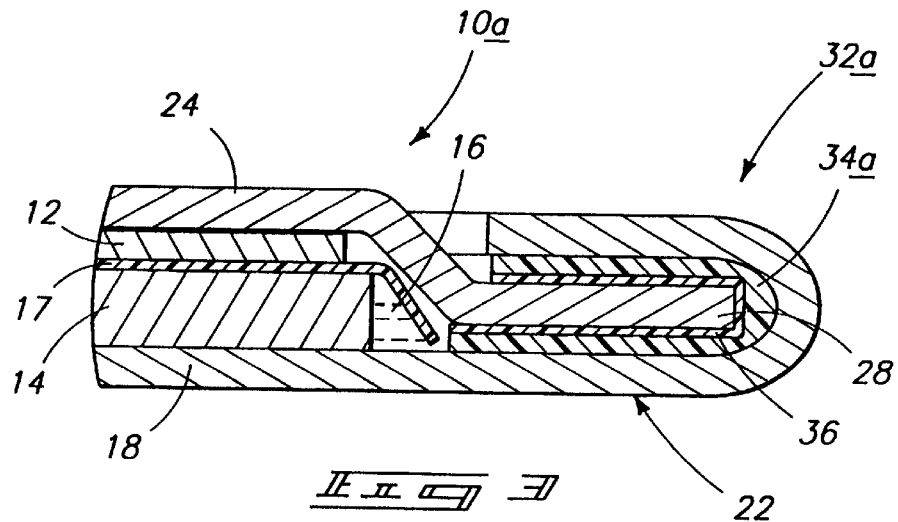
FIG. 3 is an enlarged cross-sectional view of a peripheral sealing portion of an alternate embodiment assembled button-type battery construction.

This disclosure of the invention is submitted in furtherance of the constitutional purposes of the U.S. Patent Laws "to promote the progress of science and useful arts" (Article 1, Section 8).

This invention concerns "coin" or "button-type" batteries also referred to as "button cells", and their components. A button-type battery is typically a small, circular-shaped energy cell approximately the size of a small coin. The button-type battery can be constructed in different sizes, with typical diameters being 12 mm, 16 mm, and 20 mm. Other shapes are possible, but the circular shape is most common.

In accordance with one aspect of the invention, a button-type battery comprises:

an anode;

a cathode positioned adjacent to the anode;

an electrolyte between the anode and the cathode;

a conductive first terminal housing member in electrical contact with one of the anode or the cathode; the first terminal housing member having a periphery;

a conductive second terminal housing member in electrical contact with the other of the anode or the cathode; the second terminal housing member having a periphery;

the first and second terminal housing members forming an enclosed housing which holds and protects the anode, the cathode and the electrolyte; and the first and second terminal housing member peripheries being configured together to form an electrically insulative seal which seals the anode, the electrolyte and the cathode within the housing formed by the first and second terminal housing members, the electrically insulative seal comprising cross-linked butyl rubber.

In accordance with another aspect of the invention, seal area of the battery comprises a chemical precursor to formation of butyl rubber.

In accordance with another aspect of the invention, a method of forming a button-type battery comprises the following steps:

providing an electrically conductive first terminal housing member material;

depositing an electrically insulative chemical precursor material to formation of butyl rubber relative to a sealing region of the first terminal housing member material, the deposited precursor material being void of any polymerizing or curative agents;

providing the first terminal housing member material into a shape of a desired first terminal housing member;

providing an electrically conductive second terminal housing member in facing juxtaposition to the first terminal housing member having the deposited butyl rubber precursor material, the second terminal housing member having a sealing region;

providing an anode and a cathode having an electrolyte positioned therebetween; the anode, the cathode, and the electrolyte being positioned intermediate the juxtaposed first and second terminal housing members; the anode being positioned to electrically connect with one of the first or second terminal housing members and the cathode being positioned to electrically connect with the other of the first or second terminal housing members; and joining the sealing regions of the first and second terminal housing members together to form an enclosed battery housing retaining the anode, the cathode and the electrolyte; the electrically insulative butyl rubber precursor material void of any polymerizing and curative agents being interposed between the joined first and second terminal housing members; the precursor material between the joined first and second terminal housing members comprising an electrically insulative fluid-tight seal therebetween.

In accordance with still a further aspect of the invention, a method of forming a button-type battery comprising the following steps:

providing an electrically conductive first terminal housing member material, depositing an uncured electrically insulative chemical precursor material to formation of butyl rubber relative to a sealing region of the first terminal housing member material, the deposited uncured precursor material comprising a curative and polymerizing agent capable of curing the material into polymerized cross-linked butyl rubber, the method comprising in situ curing of the chemical precursor material into butyl rubber;

providing the first terminal housing member material into a shape of a desired first terminal housing member;

providing an electrically conductive second terminal housing member in facing juxtaposition to the first terminal housing member having the deposited butyl rubber precursor, the second terminal housing member having a sealing region;

providing an anode and a cathode having an electrolyte positioned therebetween; the anode, cathode, and electrolyte being positioned intermediate the juxtaposed first and second terminal housing members; the anode being positioned to electrically connect with one of the first or second terminal housing members and the cathode being positioned to electrically connect with the other of the first or second terminal housing members; and joining the sealing regions of the first and second terminal housing members together to form an enclosed battery housing retaining the anode, cathode and electrolyte comprising an electrically insulative fluidtight seal therebetween; the insulative fluid tight seal comprising in situ formed butyl rubber.

Referring first to FIGS. 1 and 2, a button-type battery is indicated generally with reference numeral 10. Battery 10 has an anode 12, a cathode 14, and a liquid electrolyte 16 between the anode and cathode. A porous separator 17 is positioned between anode 12 and cathode 14 to ohmically separate the anode and cathode and retain electrolyte therebetween.

Button-type battery 10 also includes a circular conductive first, lower, or bottom terminal housing member 18 which forms the can of the energy cell. First terminal housing member 18 has a central portion 20 in electrical contact with cathode 14 and a periphery 22 surrounding central portion 20. First housing member 18 defines a positive battery terminal as it ohmically contacts cathode 14.

Battery 10 has a circular conductive second, upper, or top terminal housing member 24 which forms the lid of the energy cell. Second terminal housing member 24 has a central portion 26 in electrical contact with anode 12 and a periphery 28 surrounding central portion 26. In ohmic connecting with anode 12, second housing member 24 defines a negative battery terminal. First and second terminal housing members 18 and 24 combine to form an enclosed housing 30 which holds and protects anode 12, cathode 14, and electrolyte 16.

Anode 12, cathode 14, electrolyte 16 and separator 17 can be formed of conventional construction. For example, anode 12 can comprise elemental lithium provided on a copper backed foil, and having a preferred thickness of approximately 2 mils (0.0508 mm). Cathode 14 can be formed of a compressed tablet made from a composite of manganese (IV) oxide, carbon, and teflon powder, and having a preferred thickness of 8 mils (0.2032 mm). An example electrolyte 16 comprises a solution of propylene carbonate and ethylene glycol dimethylether, having dissolved lithium tetrafluoroborate and dimethylether. The volume of electrolyte 16 provided within first terminal housing member 18 at pre-assembly is preferably gauged to fill the substantial void within housing member 18, yet not so great to leak upon crimp sealing of the battery assembly.

Separator 17 is preferably formed of a woven or porous polymeric material, such as polyethylene, polypropylene, or teflon. Separator 17 preferably has unidirectional pores formed in the "Z" direction to facilitate electrolytic conductivity between anode 12 and cathode 14. An example preferred thickness for separator 14 is 1 mil (0.0254 mm).

First and second terminal housing members 18 and 24 are preferably formed of a conductive material having a thickness of less than 8 mils (0.2032 mm), with a thickness in a range of approximately 3–5 mils (0.0762–0.1270 mm) being more preferred. An example material used for the terminal housing members is type 304 stainless steel.

First and second terminal housing member peripheries 22 and 28 are configured together to form an electrically insulative seal which seals anode 12, electrolyte 16, and cathode 14 within housing 30 formed by first and second terminal housing members 18 and 24. In one preferred embodiment, electrically insulative seal 32 comprises crosslinked butyl rubber material 34. Preferably, the electrically insulative portion of seal 32 consists essentially of a butyl rubber material. Such can be provided in the form of a pre-formed gasket which is placed within first terminal housing member 18 immediately prior to assembly. Alternately, butyl rubber material can be formed in situ relative to second terminal housing member 18 either before or after member 18 is formed into a desired shape. Example methods of construction are further described below. Ideally where a goal is to produce a thinnest possible battery, the FIGS. 1 and 2 construction will have a total combined thickness of less than 1 mm. Butyl rubber in use in a sealing gasket for a button-type battery provides advantages of significant water resistance, and a high compression set resistance which does not cold flow or relax under compressive forces of the battery crimp.

FIG. 3 illustrates an alternate embodiment electrically insulative seal 32a. Like numerals from the first described embodiment are utilized where appropriate, with differences being indicated by different numerals or with the suffix "a". Here, seal 32a of button-type battery 10a comprises a pre-formed gasket material 34a which consists essentially of a polymer which is not butyl rubber. Examples include polyethylene, polypropylene or an epoxy resin which has been screen printed onto can periphery 22. A separate cross-linked butyl rubber material 36 is included within seal 32a. Such can be a separate pre-formed butyl rubber gasket, or in situ formed in place atop gasket 34a, as will be more fully explained below.

As an alternate embodiment, seal materials 34, 34a or 36 can preferably comprise a chemical precursor to formation of butyl rubber. Example butyl rubber precursors include isobutylene, isoprene or a mixture thereof. Further, such chemical precursors to formation of butyl rubber can preferably comprise depolymerized butyl rubber. An example depolymerized butyl rubber material is Kalene 800, available from Hardman, a division of Harcros Chemicals, Inc. of Belleville, N.J.

Such material can be utilized without addition of any supplemental curing or cross-linking agent which would transform such material into a butyl rubber. Further in accordance with the example FIG. 3 embodiment, material 34a of seal 32a could comprise a pre-formed gasket consisting essentially of butyl rubber, with material 36 comprising depolymerized butyl rubber which is in contact therewith.

Figure 4:
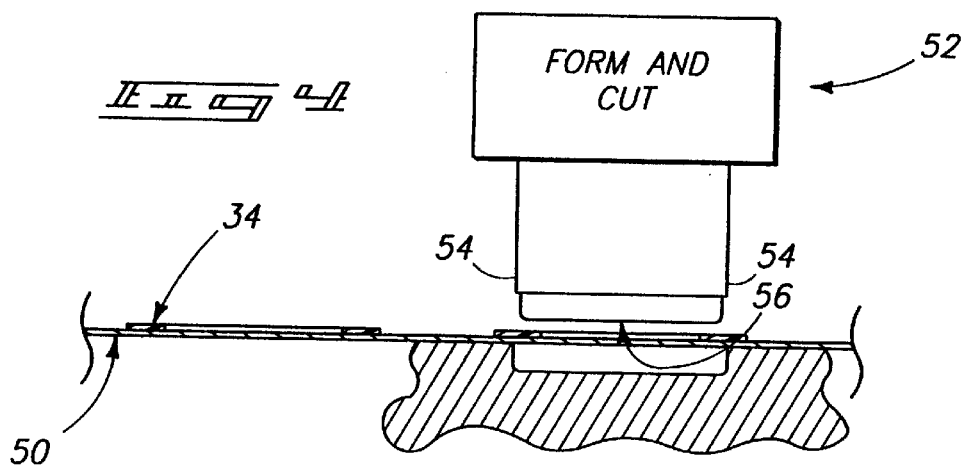
FIG. 4 is a diagrammatic side sectional plan view of a processing step in accordance with the invention.

With respect to utilization of an ultimately uncured chemical precursor to butyl rubber, such could be provided relative to a first terminal housing member either before or after the first terminal housing member's shape has been completed. An example process of utilizing such material prior to shaping of first terminal housing member 18 is described with reference to FIGS. 4–6.

Specifically, a continuous electrically conductive first terminal housing member material sheet 50 from which first terminal housing member 18 will be formed is provided. An electrically insulative chemical precursor material 34 to formation of butyl rubber is deposited relative to what will be a sealing region of the first terminal housing member. Such deposited precursor, in accordance with this example aspect of the invention, is void of any polymerizing or curative agents such that the precursor remains substantially un-polymerized upon process completion. The preferred materials are again isobutylene, isoprene, mixtures thereof, or depolymerized butyl rubber such as the Kalene 800.

The deposited material might also preferably comprise some viscosity reducing solvent to facilitate initial flow and deposition of material 34. Example solvents include hexane, toluene, and methyl ethyl ketone. Prior to assembly, and most preferably prior to cutting and forming, the viscosity reducing solvent will substantially evaporate to raise the viscosity of the deposited precursor material 34. Were a battery of the FIG. 3 construction being formed, a layer 36 would at this point in the process have been deposited atop a preapplied or preset gasket 34a which could comprise butyl rubber or some other material.

Figure 5:
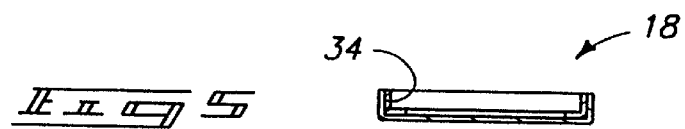
FIG. 5 is a side cross-sectional view of a single battery terminal housing member produced in accordance with methodical aspects of the invention.
Figure 6:
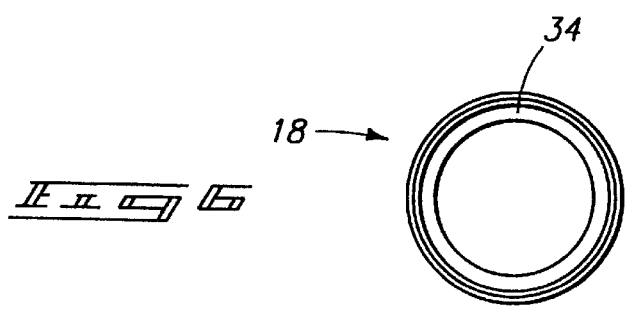
FIG. 6 is a top view of FIG. 5.

Sheet 50 is passed through a cutting and forming station 52. There, a plurality of discrete first terminal housing members 18 are sequentially cut to form resultant first terminal housing members 18. Station 52 comprises a cutting and forming tool including a ring die cutter 54. A central forming press 56 is sized to engage sheet 50 as it is cut as shown. FIGS. 5 and 6 illustrate one example first terminal housing 18 which has been formed into a shape of a desired first terminal housing member.

Referring to FIG. 7, anode 12, cathode 14, electrolyte 16, separator 17, first terminal housing 18 and second terminal housing 24 are shown in a pre-assembly exploded view. The first and second terminal housing member peripheral areas 22 and 28 comprise a sealing region for the battery. In a preferred embodiment (not shown), the figure would be inverted, with anode 12 being previously adhered to second terminal housing 24 with electrolyte 16 and separator 17 received therein.

Referring to FIG. 8, first and second terminal housing members 18 and 24 are pressed together and sealing portion 22 of first terminal housing 18 is initially bent inwardly to begin the crimping. Bending continues to produce the finished FIG. 2 construction such that the sealing regions are joined and a battery housing is formed.

A similar process can be utilized to produce the desired battery having a resultant butyl rubber containing seal. Specifically, an uncured electrically insulative chemical precursor material to formation of butyl rubber can be deposited relative to a sealing region of a first terminal housing member in either a sheet shape or can shape. The deposited uncured precursor material would comprise an appropriate curative and polymerizing agent capable of curing the deposited material into polymerized cross-linked butyl rubber. Examples are provided below. The inventive method further comprises in situ curing the chemical precursor material with such agent into butyl rubber. Such curing might be, in one example, substantially completed before joining the sealing regions of the first and second terminal housing members to form the resultant enclosed battery housings. Alternately, the chemical precursor material might be substantially uncured at the point of combining with the second terminal housing member, with the curing not being substantially completed until after joining. Further at the time of deposition relative to a first terminal housing member, the deposited precursor material including precursor and curative agent might comprise a viscosity reducing solvent which ultimately evaporates. Further, the deposited precursor and curative agent could be deposited directly to a first terminal housing member material or to gasket material previously provided thereto, such as existing formed butyl rubber or another suitable insulating gasket material.

Accordingly, one example preferred method in accordance with the invention includes in situ formation of butyl rubber relative to the first terminal housing member, as opposed to previous butyl rubber formation and subsequent application to a first terminal housing member. Further, a chemical precursor to butyl rubber formation might be utilized as a primary final inherent gasketing material, or as a supplemental sealant or adhesive material utilized in conjunction with some other primary gasket which may or may not comprise or consist essentially of butyl rubber.

The following are examples of possible formulations for curable, polymerizable and cross-linking materials which can be deposited relative to a first terminal housing member for ultimate in situ curing into polymerizable rubber.

FORMULA #1

Kalene 800 = 100 parts
Quinone dioxime = 2 parts
Lead peroxide ($PbO_2$) = 4 parts -continued

FORMULA #2

Kalene 800 = 100 parts
Quinone dioxime = 2 parts
Lead tetraoxide ($Pb_3O_4$) = 8 parts

FORMULA #3

Kalene 800 = 100 parts
Quinone dioxime = 2 parts
Lead tetraoxide = 6 parts
Benzothiazyl disulphide = 4 parts

FORMULA #4

Kalene 800 = 100 parts
p-(dibenzoyl quinone dioxime) = 6 parts
Lead tetraoxide = 10 parts

FORMULA #5

Kalene 800 = 100 parts
Quinone dioxime = 1 part
Benzothiazyl disulphide = 2 parts
Tetrachloro-p-benzoquinone = 1 part

FORMULA #6

Kalene 800 = 100 parts
Quinone dioxime = 2 parts
Zinc oxide (uncoated) = 2 to 5 parts

FORMULA #7

Kalene 800 = 100 parts
Quinone dioxime = 2 parts
Calcium oxide = 2 to 5 parts

The quinone dioxime comprises a non-sulfur vulcanizing agent for the various formulations. Lead tetraoxide functions as an activator. Para-dibenzoyl quinone dioxime also functions as a non-sulfur vulcanizing agent. Additional possible sealants might also be utilized. The above formulations will all cure into butyl rubber at room temperature, with the rate of curing decreasing as one proceeds from Formula #1 to Formula #7. With the above formulas, both the working life of the mixture (the viscosity change) and the time it takes to full cure increase in progressing from Formula #1 to Formula #7.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A thin profile battery defined by a thickness which is less than a maximum linear dimension of its anode having a seal comprising depolymerized butyl rubber.

2. The thin profile battery of claim 1 comprising a button-type battery shape.

3. A thin profile battery defined by a thickness which is less than a maximum linear dimension of its anode having a seal comprising a pre-formed gasket and a chemical precursor to formation of butyl rubber, the chemical precursor being in contact with the pre-formed gasket.

4. The battery of claim 3 wherein the pre-formed gasket consists essentially of butyl rubber.

5. The battery of claim 3 wherein the chemical precursor comprises depolymerized butyl rubber.

6. The thin profile battery of claim 3 comprising a button-type battery shape.

7. A method of forming a thin profile battery defined by a thickness which is less than a maximum linear dimension of its anode, comprising:

providing a depolymerized butyl rubber material in a sealing region of the battery, the material being void of any polymerizing or curative agents.

8. The method of forming a battery of claim 7 wherein the depolymerized butyl rubber material comprises a viscosity reducing solvent, the method further comprising allowing the viscosity reducing solvent to evaporate to raise the viscosity of the provided material.

9. The method of forming a battery of claim 7 wherein the material comprises a compound selected from the group consisting of isobutylene, isoprene and mixtures thereof.

10. The method of forming a battery of claim 7 wherein the battery is formed into a button-type battery shape.

11. A method of forming a thin profile battery defined by a thickness which is less than a maximum linear dimension of its anode, comprising:

providing an electrically conductive first terminal housing member material;

forming the first terminal housing member material into a shape of a desired first terminal housing member;

after forming the first terminal housing member into the shape of a desired first terminal housing member, depositing a butyl rubber precursor material in a sealing region of the first terminal housing member material;

providing an electrically conductive second terminal housing member, the second terminal housing member having a sealing region; and joining the sealing regions of the first and second terminal housing members together to form an enclosed battery housing.

12. The method of forming a battery of claim 11 wherein the battery is formed into a button-type battery shape.

13. The method of forming a battery of claim 12 wherein the precursor comprises depolymerized butyl rubber.

14. A method of forming a thin profile battery defined by a thickness which is less than a maximum linear dimension of its anode, the method comprising the following steps:

providing a first terminal housing member;

providing a pre-formed gasket within the first terminal housing member;

depositing an unpolymerized butyl rubber precursor onto the pre-formed gasket;

after the depositing, providing an electrically conductive second terminal housing member in facing juxtaposition to the first terminal housing member;

providing an anode and a cathode intermediate the juxtaposed first and second terminal housing members, and providing a separator between the anode and the cathode, the separator being porous to an electrolyte;

joining the first and second terminal housing members together to form an enclosed battery housing retaining the anode and the cathode; and in situ curing of the butyl rubber precursor on the pre-formed gasket.

15. The method of claim 14 wherein the pre-formed gasket comprises butyl rubber.

16. The method of claim 14 wherein the pre-formed gasket consists essentially of butyl rubber.

17. The method of claim 14 wherein the butyl rubber precursor is substantially uncured at the step of joining the first and second terminal housing members, the in situ curing not being substantially completed until after the joining step.

* * * * *

UNITED STATES PATENT AND TRADEMARK OFFICE
CERTIFICATE OF CORRECTION

PATENT NO.    : 5,900,333
DATED         : May 4, 1999
INVENTOR(S)   : Rickie C. Lake It is certified that error appears in the above-identified patent and that said Letters Patent is hereby corrected as shown below:

Col. 5, l. 11:   Replace "pre[0a%o6]ormed" with --pre-formed--.

Signed and Sealed this

Fourteenth Day of September, 1999

Attest:

Q. TODD DICKINSON

*Attesting Officer*           *Acting Commissioner of Patents and Trademarks*